July 2, 1940.　　　　C. A. McAVOY　　　　2,206,848
WATER-TIGHT CONTAINER
Filed June 30, 1939
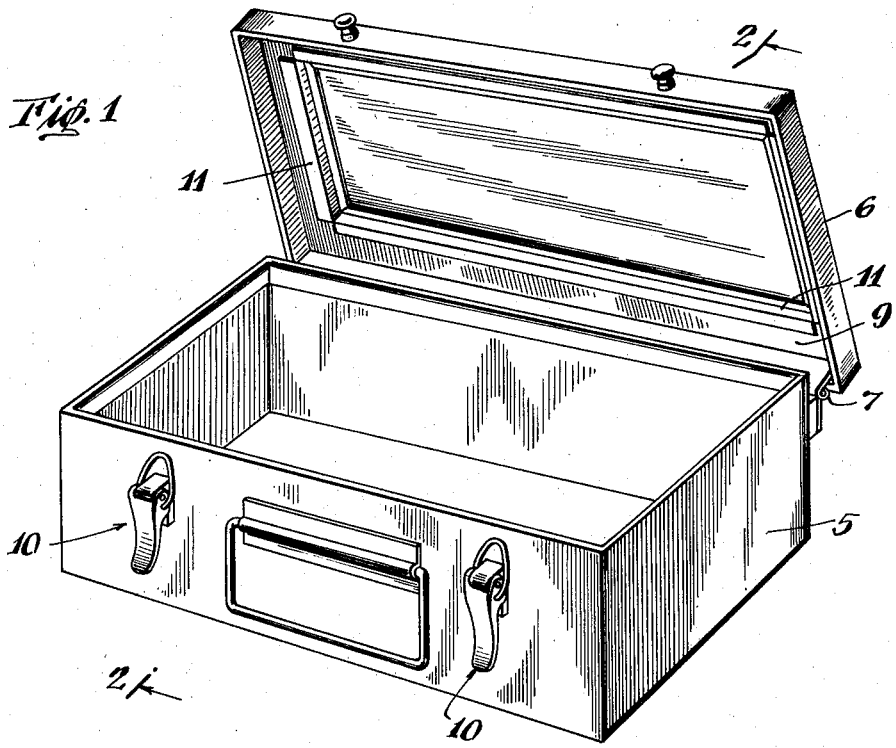
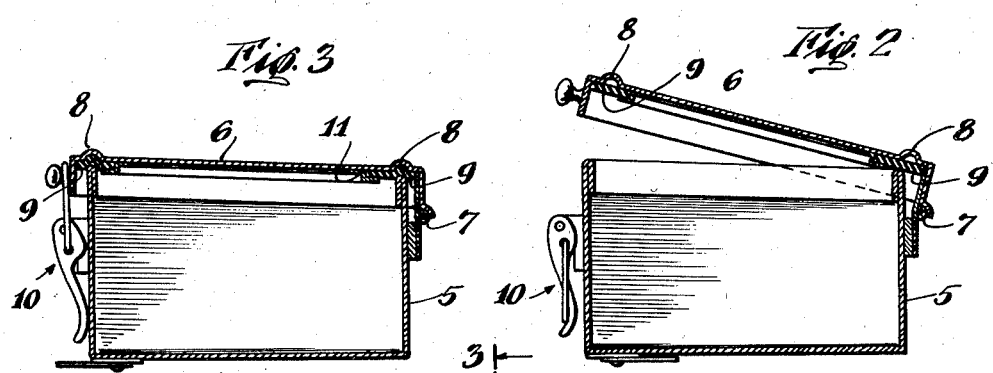
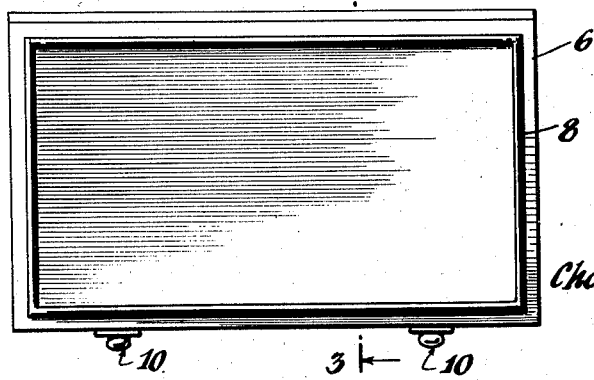
INVENTOR
Charles A. McAvoy
BY
ATTORNEY Patented July 2, 1940

2,206,848

UNITED STATES PATENT OFFICE 2,206,848

WATER-TIGHT CONTAINER

Charles A. McAvoy, New York, N. Y., assignor to Burroughs Wellcome & Co. (U. S. A.) Inc., New York, N. Y., a corporation of New York Application June 30, 1939, Serial No. 282,104

1 Claim. (Cl. 220—46)

This invention relates to a waterproof and watertight container and more particularly a container to be used by physicians and surgeons to carry instruments and various kinds of medicines which are deleteriously affected by the action of moisture or for use as a first aid kit or the like.

Many attempts have been made to provide such a container, but so far as I am aware, the only type of watertight container at present available is a double shell case. In these cases the inner shell fits snugly into a heavier outer shell through an opening on the side of the outer container. Needless to say, such type is bulky, heavy and involves considerable time in fitting the inner casing into the outer shell.

An object of the present invention is to make a container which is waterproof and moistureproof, compact in form and easily manipulated.

Another object is to have a container in which the pressure requisite to make a water-tight joint is distributed evenly entirely around the container.

Although the novel features which are believed to be characteristic of this invention will be more particularly pointed out in the claims appended hereto, the invention itself may be better understood by referring to the following description, taken in connection with the accompanying drawing, in which specific embodiments thereof have been set forth for purposes of illustration.

In the drawing,

Fig. 1 shows a perspective view of the container with the lid open;

Fig. 2 is a cross section thereof taken on the line 2—2 of Fig. 1 with the lid open;

Fig. 3 is a view similar to Fig. 2 with the lid closed;

Fig. 4 is a plan view of the underside of the cover.

In the specific embodiment shown, Fig. 5 indicates the end and front of a rectangular case. The case may be made of any hard, durable material, but is preferably made of enamelled metal. Attached to the rear side of the case 5 is a cover 6 hinged at 7. The underside of the cover 6 has a groove 8 extending entirely around the cover, as shown in Fig. 4. This groove 8 is spaced equidistantly from the edge of the cover and is so formed that the groove in the cover corresponds with and fits over the sides and ends of the receptacle 5. Over the groove 8 and extending entirely around the cover is a strip of deformable waterproofing material 9, such as rubber, shown in Figs. 3 and 4. When the cover is pressed down and tightly secured by any suitable latch mechanism 10, preferably of the toggle type for exerting substantial closing force, as shown in Fig. 3, the rubber 9 is forced into the groove 8 by the top edges of the sides and ends 5 of the container. The strip of waterproof material 9, (preferably rubber) is held in position by a metal flange 11 extending around the underside of the cover. This metal flange terminates at a point closely adjacent to the groove 8. It will be seen that when the cover 6 is pressed down on the casing 5 the edges of the casing will force the waterproof material or rubber into the groove 8 and form a watertight joint, as illustrated in Fig. 3.

It is obvious that the pressure exerted by the cover in forcing the waterproofing material into the groove must be uniform over the entire casing. To facilitate accomplishing this, the casing 5, as appears from Figs. 2 and 3, may be made of less height in the rear of the case, where the hinges are secured, than at the front. A container constructed according to this invention has been immersed under water for a period of more than three hours without any moisture seeping into the interior of the container.

What I claim is:

A water-tight container comprising a rectangular body formed of metal, the front wall of the container being higher than the rear wall, the upper peripheral edge of the container being relatively sharp and continuous and lying in a common plane, a cover hinged to the outer face of the rear wall of said container, a peripheral groove formed on the underside of the cover and registering with the peripheral edge of the container when in closed position, a flexible gasket secured on the underside of the container and completely covering said groove, and a toggle latch secured on the outer face of the front wall of the container for locking the cover in tight engagement with the front of the container, said toggle latch and said hinge being so positioned on said walls that the closing and locking of the cover causes the sharp peripheral edge of the container to press the flexible gasket into the groove in the cover and to effect a water-tight seal.

CHARLES A. McAVOY.